F. J. REUTER.
TOY VEHICLE.
APPLICATION FILED JAN. 25, 1921.
1,398,392. Patented Nov. 29, 1921.
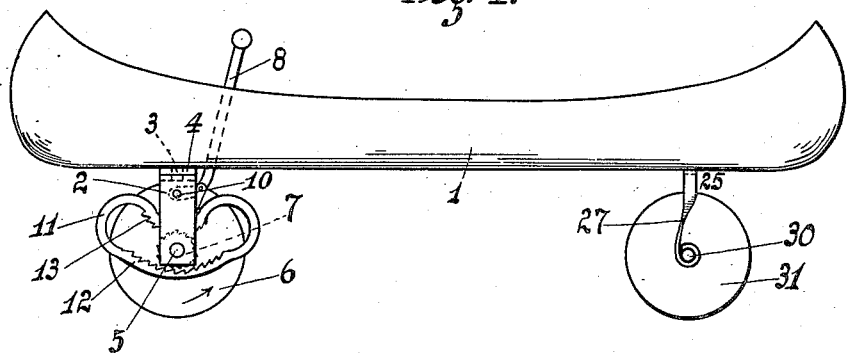
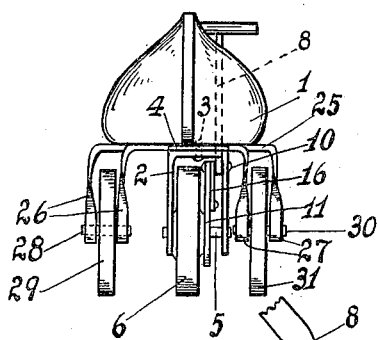
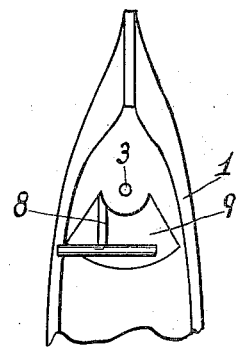
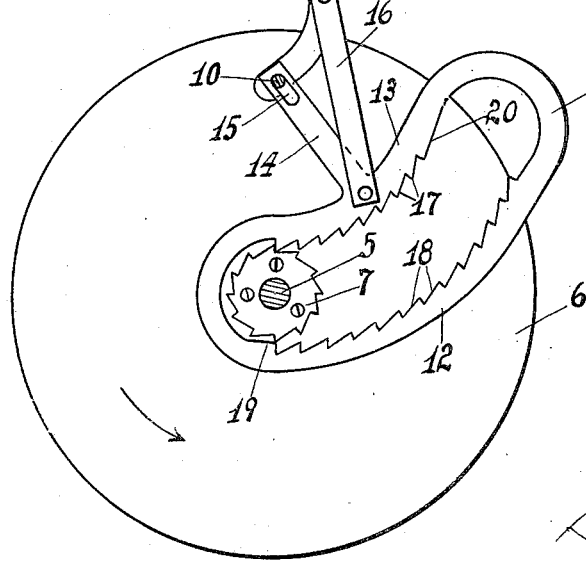
INVENTOR
Fredereck J. Reuter.
BY
Harry Schroeder
ATTORNEYS

UNITED STATES PATENT OFFICE.

FREDERECK J. REUTER, OF OAKLAND, CALIFORNIA.

TOY VEHICLE.

1,398,392.     Specification of Letters Patent.     Patented Nov. 29, 1921.

Application filed January 25, 1921. Serial No. 439,893.

*To all whom it may concern:*

Be it known that I, FREDERECK J. REUTER, a citizen of the United States, residing at Oakland, in the county of Alameda and State of California, have invented certain new and useful Improvements in Toy Vehicles, of which the following is a specification.

My invention is a toy vehicle, the body of which is in the form of a canoe and includes manually operated driving and steering means.

Referring to the annexed drawing in which my invention is illustrated and which forms a part of this specification—

Figure 1 is a side elevation of my invention.

Fig. 2 is a front elevation of my invention.

Fig. 3 is a plan view of the forward end of my invention.

Fig. 4 is an enlarged side elevation partly broken away of the driving and steering mechanism.

In the drawing 1 indicates the body of the vehicle which is in the form of a canoe.
To the underside of the body 1 near the front end thereof is pivoted an inverted U-shaped frame 2, a king bolt 3 extends through the frame 2 and the bottom of the canoe, and a plate 4 secured to the underside of the canoe. The plate 4 is interposed between the frame 2 and the bottom of the vehicle 1. In the lower ends of the depending vertical arms of the frame 2 is journaled an axle 5 on which is secured the front wheel 6 of the vehicle. A ratchet 7 is secured to one side of the hub of the wheel 6 on the axle 5. A propelling and steering lever 8 extends through an opening 9 in the bottom of the canoe and is pivoted by screw pivot 10 to the inside of frame 2. A frame 11 has a pair of arcuate members 12 and 13 concentric to pivot 10, which members extend respectively under and over the ratchet 7 and from the member 13 extends a radial arm 14 having a longitudinal slot 15 in its outer upper end through which extends the pivot 10. A link 16 is pivoted at one end to the frame 11 at the juncture of member 13 and arm 14 and at its other end to the lever 8 rearwardly of the pivot 10. Ratchet teeth 17 are provided on the under side of the frame member 13 for engaging the teeth of the ratchet 7 at the upper side of the ratchet. Ratchet teeth 18, extending in a direction opposite to the direction of ratchet teeth 17 are provided on the upper side of frame member 12 for engaging the teeth of the ratchet 7 at the lower side thereof. A cam 19 is provided on the upper side of frame member 12 forwardly of the teeth 18. A cam 20 is provided on the under side of the frame member 13 rearwardly of the teeth 17.

A frame 25 is secured to the under side of the body 1 near the rear end thereof, said frame including a pair of depending members 26 at the right side and a pair of depending members 27 at the left side. An axle 28 is journaled in the lower end of the frame members 26 and one of the rear wheels 29 of the vehicle is secured on said axle between said members. An axle 30 is journaled in the lower end of the frame members 27 and the other rear wheel 31 of the vehicle is secured on said axle between said frame members.

When the lever 8 is swung rearwardly the teeth 17 engage the teeth of ratchet 7 and rotate said ratchet and the wheel 6 which drives the vehicle forwardly until the cam 20 engages the ratchet teeth and lifts the rearmost tooth of the teeth 18 into engagement with the teeth of the ratchet 7, the slot 15 and the pivotally connected link 16 permitting the lifting of the frame 11. Upon swinging the lever 8 forwardly the teeth 18 engaging the teeth of ratchet 7 rotate the ratchet and the wheel 6, which continues the forward driving of the vehicle until the cam 19 engages the ratchet teeth and draws the foremost teeth 17 downwardly into engagement with the ratchet teeth, the slot 15 and pivoted link 16 permitting the downward movement of the frame 11. The lever 8 may then again be swung rearwardly and the above described operations repeated to drive the vehicle.

By swinging the lever to the right or left the frame 2 and wheel 6 are turned to the right or left whereby the vehicle is steered.

Having described my invention, I claim:

1. A toy vehicle including a body, rear wheels on which said body is mounted, a frame on which the forward end of said body is pivotally mounted, a front wheel journaled in said frame, a lever pivoted to said frame and extending upwardly through the forward end of said body, a ratchet on said wheel, a frame including two arcuate members concentric to said lever pivot and an arm extending radially to said pivot and having a longitudinal slot through which said pivot extends, a link pivoted at one end to said frame and at its other end to said lever, ratchet teeth on the inside of each of said arcuate frame members for engaging the teeth at the upper and lower side of said ratchet respectively, the teeth on said members extending in opposite directions, a cam on the inside of the upper arcuate member rearwardly of the teeth on said member for engaging said ratchet and lifting the teeth of the upper arcuate member out of engagement with the teeth of said ratchet and the teeth on the lower arcuate member into engagement with the ratchet teeth, and a cam on the inside of the lower arcuate frame member forwardly of the teeth on said member for engaging said ratchet and drawing said teeth out of engagement with the ratchet teeth and drawing the teeth on the upper arcuate member into engagement with the ratchet teeth.

2. A toy vehicle including a body, rear wheels on which said body is mounted, a wheel frame, a front wheel journaled in said frame, a lever pivoted to said frame, and extending upwardly through the forward end of said body, a ratchet on said wheel, a horizontally swinging frame including two arcuate members concentric to said lever pivot, and an arm extending radially to said pivot and having a longitudinal slot through which said pivot extends, a link pivoted at one end to said frame and at its other end to said lever, ratchet teeth on the inside of each of said arcuate frame members, and means for alternately meshing said ratchet teeth with the ratchet, the space between the ratchet teeth being greater than the diameter of the ratchet.

In testimony whereof I affix my signature.

FREDERECK J. REUTER.